United States Patent [19]
Fettweis

[11] Patent Number: 5,270,962
[45] Date of Patent: Dec. 14, 1993

[54] MULTIPLY AND DIVIDE CIRCUIT

[75] Inventor: Gerhard P. Fettweis, Berkeley, Calif.

[73] Assignee: Teknekron Communications Systems, Inc., Berkeley, Calif.

[21] Appl. No.: 31,026

[22] Filed: Mar. 11, 1993

Related U.S. Application Data

[63] Continuation of Ser. No. 881,336, May 9, 1992, abandoned.

[51] Int. Cl.$^5$ .............................................. G06F 7/52
[52] U.S. Cl. ................................. 364/766; 364/736
[58] Field of Search .............. 374/766, 767, 759, 760, 374/736, 750.5

[56] References Cited

U.S. PATENT DOCUMENTS

| | | | |
|---|---|---|---|
| 4,065,666 | 12/1977 | Wu | 364/766 |
| 4,550,339 | 10/1985 | Fling | 364/766 |
| 5,012,439 | 4/1991 | Nash et al. | 364/766 |
| 5,130,944 | 7/1992 | Chung et al. | 364/766 |

OTHER PUBLICATIONS

T. E. Williams, M. A. Horowtiz, "A zero-overhead self-timed 160ns 54-b CMOS divider", IEEE Journal Solid State Circuits; 26(11):1651-61, Nov. 1991.
A. Vandemeulebroecke, E. Vanzieleghem, T. Denayer, P. G. A. Jespers, "A new carry-free division algorithm and its application to a single-chip 1024-b RSA processor"; IEEE Journal Solid State Circuits, 25(3); 748-56, Jun. 1990.
H. Edamatsu, T. Taniguchi, S. Kuninobu, "A 33 MFLOPS floating point processor using redundant binary representation"; In Proceedings IEEE ISSCC'88, pp. 152-153 and 342-343.

*Primary Examiner*—David H. Malzahn
*Attorney, Agent, or Firm*—Limbach & Limbach

[57] ABSTRACT

A multiply and divide circuit having full bit level pipeline capability uses an array of bit level carry-save adders with each carry-save bit adder having a corresponding absolute value bit circuit. In one or two's complement notation, the carry-save adders subtract the binary values supplied thereto and generate an intermediate binary signal which is supplied to the absolute value circuit. The absolute value circuit determines the absolute value of the binary numbers supplied thereto. In one mode of operation, the circuit can be used to perform division. In another mode of operation, the circuit can be used to perform multiply and accumulate operation, again with bit level pipeline capability.

16 Claims, 9 Drawing Sheets

MULTIPLY AND DIVIDE CIRCUIT

This is a continuation of co-pending application Ser. No. 07/881,336 filed on May 9, 1992, now abandoned.

FIELD OF THE INVENTION

The present invention relates to a digital multiply and divide circuit that can perform multiplication and accumulate (MAC) function or division function, pipelined at a bit level.

BACKGROUND OF THE INVENTION

Of the four basic arithmetic operations of addition, subtraction, multiplication and division, circuits have been designed to operate the functions of addition, subtraction and multiplication which can be pipelined at a bit level. To date, however, division operation has been performed by circuits which are either long and time consuming such as by the use of a DSP or required long-latency and complex hardware implementations in VLSI technology. Many circuits have been proposed for implementing division operation in an effective manner. See, for example: O. Spaniol. Computer Arithmetic, Logic and Design. Wiley, 1981; O. Spaniol. Arithmetic in Rechenanlagen, volume 34 of Studienbucher Informatik. Teubner, 1976; V. Carl Hamacher. Computer Organization. McGraw-Hill, 1984; K. Hwang. Computer Arithmetic. John Wiley & Sons, 1979; and N. R. Scott. Computer number systems and arithmetic. Prentice Hall, Englewood Cliffs, 1988.

A fast divide circuit can find use in digital signal processing applications such as speech processing or cryptography. See, for example: T. E. Williams and M. A. Horowitz. A zero-overhead self-timed 160 ns 54-b CMOS divider. IEEE Journal Solid State Circuits, 26(11):1651–61, 1991; A. Vandemeulebroecke, E. Vanzieleghem, T. Denayer, and P. G. A. Jespers. A new carry-free division algorithm and its application to a single-chip 1024-b RSA processor. IEEE Journal Solid State Circuits, 25(3):748–56, 1990; and H. Edamatsu, T. Taniguchi, and S. Kuninobu. A 33 MFLOPS floating point processor using redundant binary representation. In Proceedings IEEE ISSCC'88, pages 152–153, 1988.

The basic algorithm for dividing a binary numerator value (N), by a denominator value (D) to produce a quotient binary value (Q) is given by the following equation: $N/D = Q = Q_J \ldots Q_0$. Where each of the binary numbers N and D are all assumed to be of the same binary length W and Q has J significant bits. In most operations $J = W$. There are two basic algorithms for solving the above division problem.

The first is termed restoring algorithm. It is as follows:

```
DO I = W−1 to 0
    N = N−D
    IF (N>0)
        THEN:   Q_I = 1
        ELSE:   Q_I = 0
                N = N + D
    D = D/2
END
```

In the restoring algorithm, W identical loops are performed recursively with each loop representing the calculation of one bit of the quotient Q. Thus, in this example, Q has W significant bits. Hence, the algorithm in software form consists of a DO loop. In the first step of the algorithm, the denominator D is subtracted from the numerator N and is stored back in the location of N replacing the numerator value. The resultant numerator value N is tested. If N is positive, the quotient bit is set to one. If the result is negative, however, the quotient bit is set to zero and the subtracted amount of D is restored or added back to the location in the numerator N and stored back into the numerator N. This is the concept of "restoring". Thereafter, the denominator value D is divided by two and stored back in the denominator value location. The process continues for the next quotient bit.

In the non-restoring, the method is equivalent. There, the algorithm is as follows:

```
Q_W = 1
DO I = W−1 to 0
    N = N − (2*Q_{I+1} − 1)*D
    IF (N>0)
        THEN:   Q_I = 1
        ELSE:   Q_I = 0
    D = D/2
END
```

Again, similar to the restoring algorithm, there are W identical stages for the W significant bits of Q. Initially, the quotient bit $Q_W$ is set to one. In the first step of the operation, D is subtracted from N and stored in N. N is now tested. If it is positive, then the quotient bit is set to one. Otherwise, the quotient bit is set to zero. D is then shifted by one bit to derive D/2. The algorithm continues whereby at the next level, N is calculated based in part upon the quotient bit calculated from the prior level. If the quotient bit from the prior level is one, the resulting calculation is:

$$N = N - D$$

On the other hand if the prior quotient bit is zero, the resultant calculation is $$N = N + D.$$

Thus, the quotient bit calculated from a prior stage determines either D is to be added or subtracted from the current value of N.

As can be seen from the foregoing, the non-restoring algorithm differs from the restoring algorithm in that there is no separate step of $N = N + D$ to restore or add the subtracted value of D back to the original N to restore it. Instead, a quotient bit calculated from a prior stage is used to control whether the subsequent operation is an addition or a subtraction operation.

A basic hardware divide circuit 10 to accomplish the foregoing non-restoring method of binary division is shown FIG. 1 and is known from the prior art. In FIG. 1, the divide circuit 10 comprises a plurality of adder/subtracters 12 (a-c ...). The first stage 12a receives the numerator value N and the denominator value D and an initial quotient bit of +1. The result of the operation of the first stage 12a is the term N-D. This value N-D is passed to the second stage 12b. In addition, the denominator value D is shifted by one bit to produce the result D/2. The result of D/2 is also inputted into the second stage 12b. The sign bit of the first stage 12a is used to control the operation of the second stage 12b. The sign bit is used to control the second stage 12b such that it acts either as an adder or as a subtracter. If the sign of the term N-D is positive, then the second stage 12b would perform a subtraction operation. On the other hand, if the sign bit from the operation of the first stage 12a is negative, then the second stage operates as an adder.

The problem with the divide circuit 10 of the prior art is that in order to perform the operation of each stage 12, the operation of a prior stage must be completed in order to obtain the sign bit of the result. The sign bit of the result of a prior stage is then used to decide if the current stage is to be an addition or a subtraction. Since the sign bit result is used, a full carry generation needs to be completed from the LSB (least significant bit) to the MSB (most significant bit). Therefore, pipelining at a bit level is inefficient.

SUMMARY OF THE INVENTION

A digital divide and multiply circuit has a first controlled inverter to receive a first binary signal (D) and generates a first intermediate binary signal in response to a first activation signal. The first intermediate binary signal is the first binary signal (D) in response to the first activation signal being in one state and the first intermediate binary signal is the inverse of the first binary signal ($\overline{D}$) in response to the first activation signal being in another state. The circuit also has a plurality of substantially identical stages. Each stage has a second circuit means which receives the first intermediate binary signal and a bit signal corresponding to one binary position of a second binary signal (E). The second circuit means generates the logical AND of the bit signal of the second binary signal (E) ANDed with each bit of the first intermediate binary signal to produce a second intermediate binary signal. A third circuit means receives a third binary signal (N) and the second intermediate binary signal and adds the signals together to produce a third intermediate binary signal. The third intermediate binary signal has a plurality of bit signals including a sign bit signal. A fourth activatable circuit means receives the third intermediate binary signal and generates a fourth intermediate binary signal in response to a second activation signal. The fourth intermediate binary signal is either the third intermediate binary signal or is the absolute value of the third intermediate binary signal dependent upon the state of the second activation signal. A fifth circuit means receives the first intermediate binary signal and shifts the first intermediate binary signal by one bit to produce a fifth intermediate binary signal with the fifth intermediate binary signal representative of the value of the number supplied to the fifth circuit means divided by two. A sixth circuit means receives the sign bit signal and a resultant bit signal from a prior stage and forms an exclusive OR therefrom to produce a resultant bit signal (Q) of the current stage. The circuit also has means for connecting the plurality of stages together by supplying the fourth intermediate binary signal from one stage as the third binary signal to the third circuit means of another stage and by supplying the fifth intermediate binary signal from one stage as the first intermediate binary signal to the second circuit means of another stage. In response to the second activation signal being in one state, the circuit generates the fourth intermediate binary signal from the last stage as a binary MAC of $D*E+N$ or $-D*E+N$, depending upon the state of the first activation signal. In response to the second binary signal E being high and the first and second activation signals being in another state, the circuit generates the resultant signal Q as a binary quotient of N/D.

BRIEF DESCRIPTION OF THE DRAWINGS

FIG. 5b is a state diagram showing a possible coding of the finite states of the absolute value bit circuit of FIG. 5a.

FIG. 8b is a detailed circuit diagram of the AND gate portion of FIG. 8a.

DETAILED DESCRIPTION OF THE DRAWINGS

Figure 1:
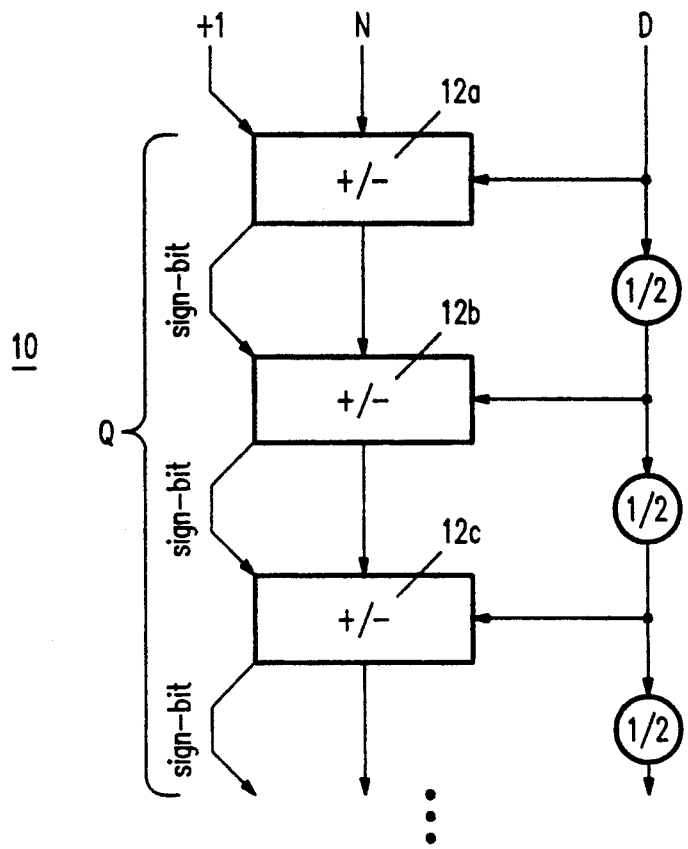
FIG. 1 is a schematic block level diagram of a divide circuit of the prior art.

Before discussing the preferred embodiment, it would be useful to discuss the theoretical basis for the divide circuit portion of the present application. In contrast to the non-restoring algorithm of the prior art wherein the operation of each stage cannot commence until the sign bit of a prior stage is determined, the circuit of the present invention performs division in the following steps:

---

$Q_w = 1$
Do I = W−1 to 0
1) N = N − D

-continued

2) $S_I$ = Signbit (N)
3) $Q_I$ = $S_I$ (EXOR) $Q_{I+1}$
4) N = |N|
5) D = D/2
END Similar to the non-restoring algorithm of the prior art, the division set forth above comprises a plurality of identical stages. There are five steps that are performed in each stage. In the first step, the denominator value D is subtracted from the numerator value N. However, if the denominator value D is represented in complement notation (such as one's or two's complement), then the operation of N+D (where D is in complement notation) is the same as N−D (with D expressed in uncomplement or "normal" notation). In the preferred embodiment described hereinafter, a two's complement value for D is disclosed. Thus, an adder would be used to perform the operation. In the second step, the result of the addition (or subtraction process) is a number having a sign bit. In the third step, the quotient bit of the current stage is determined by exclusively ORing the sign bit of the current stage with the quotient bit from a prior stage. In the fourth step, the absolute value of the added (or subtracted) number (from step 1) is taken. Finally, the denominator value D is then shifted by one bit to produce the result D/2. Since the most time consuming portion of the operation is the addition/subtraction, and since in each stage the determination of whether the operation is subtraction or addition does not depend upon the sign bit from a prior stage, considerable savings in time can be achieved. Further, as will be seen, by relying upon two's complement notation and using only adders, and more particularly as will be shown using a plurality of carry-save bit adders, bit level pipelining can be achieved.

If D were in two's complement, the result N=N−D would also be in two's complement. In that event, the sign bit for the operation in step 2 results in S= 1 when N<0 and S=0 when N>. Finally, the operation in the third step can be seen by the following truth table:

| $S_I$ | $Q_{I-1}$ | $Q_I$ |
|---|---|---|
| 0 | 0 | 0 |
| 0 | 1 | 1 |
| 1 | 0 | 1 |
| 1 | 1 | 0 |

The theoretical basis for the above method is as follows. If a prior art non-restore division operation is performed assuming the following calculated terms than the resulting $Q_I$ bits are:

| 1) N = N − D > 0 | $Q_{W-1}=1$ |
| 2) N = N − D/2 < 0 | $Q_{W-2}=0$ |
| 3) N = N + D/4 < 0 | $Q_{W-3}=0$ |
| 4) N = N + D/8 > 0 | $Q_{W-4}=1$ |

The result would be

| Q = | 1 | 0 | 0 | 1 |
|---|---|---|---|---|
|  | $Q_{W-1}$ | $Q_{W-2}$ | $Q_{W-3}$ | $Q_{W-4}$ |

Using the present method, the result would be as follows:

1) N = N − D > 0    S=0
   N = |N|
2) N = N − D/2 < 0    S=1
   N = |N|
3) N = N − D/4 > 0    S=0
   N = |N|
4) N = N − D/8 < 0    S=1
   N = |N| or 
| S = | 0 | 1 | 0 | 1 |
|---|---|---|---|---|
| Q = | 1 | 0 | 0 | 1 |
|  | $Q_W$ | $Q_{W-1}$ | $Q_{W-2}$ | $Q_{W-3}$ | $Q_{W-4}$ | with the result being the same as the prior art method.

The foregoing method an be implemented by a computer operating a program. In addition, the foregoing method can be implemented in a circuit.

Figure 2:
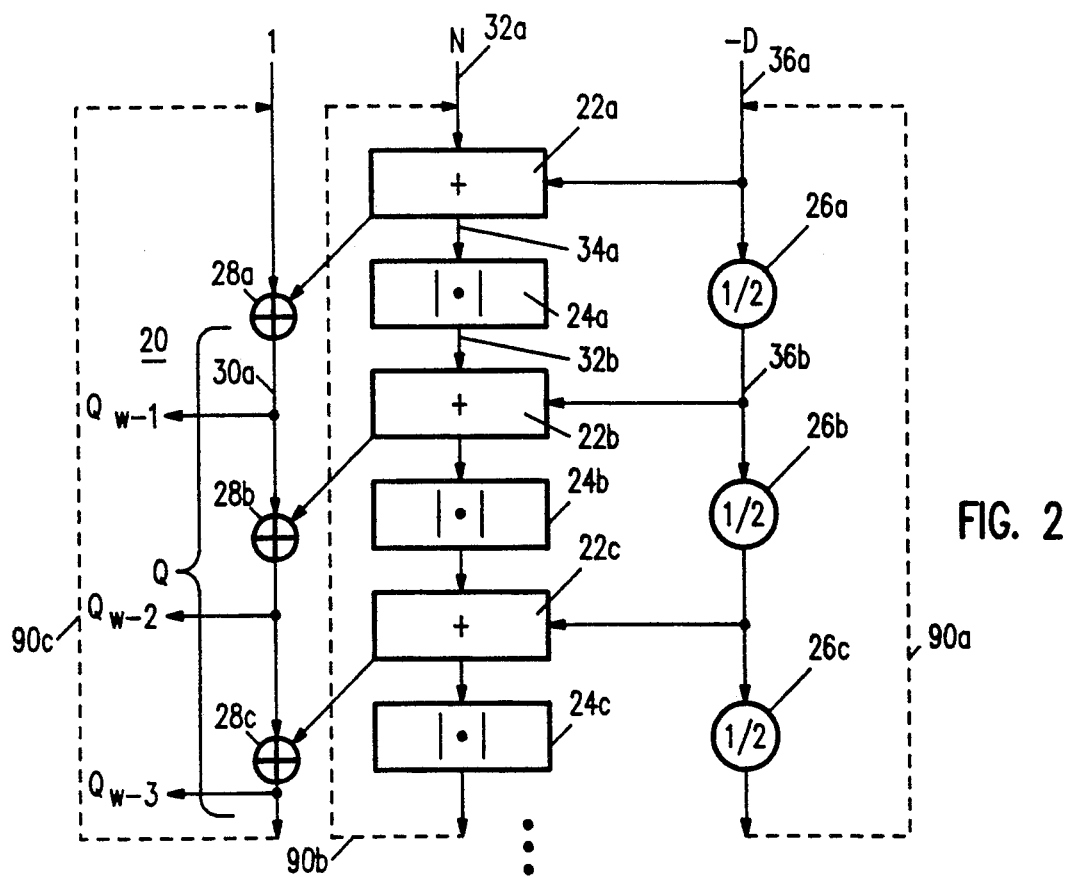
FIG. 2 is a schematic block level diagram of a divide circuit of the present application.

Referring to FIG. 2, there is shown a schematic block level diagram of a divide circuit 20, implementing the foregoing method. The circuit 20 comprises a plurality of substantially identical stages. Each stage comprises an adder 22a, which receives a first binary signal 32a and a second binary signal 36a. The second binary signal 36a represent binary values expressed in complement, such as two's complement of a negative number D. The adder 22a adds the first and second binary signals 32a and 36a and produces a first intermediate binary signal 34a. Since the second binary signal 36a is representative of a binary complement value of minus D, the addition of the first and second binary signals 32a and 36a is the equivalent of the subtraction of the second binary signal 36a from the first binary signal 32a. The first intermediate binary signal 34a also represents a binary value. The first intermediate signal 34a is supplied to an absolute value circuit 24a. The absolute value circuit 24a produces an absolute value of the first intermediate binary signal 34a. The result of the absolute value circuit 24a is a second intermediate binary signal 32b.

The divide circuit 20 also comprises a logic gate 28a which receives the sign bit signal from the first adder 22a and a quotient bit from a prior stage. The gate 28a performs the logical exclusive OR of these two signals and generates a quotient bit signal for use by the subsequent stage.

The divide circuit 20 also comprises a shift circuit 26a. The shift circuit 26a receives the second binary signal 36a and shifts it one bit to produce a shifted signal 36b. The shifted signal 36a represents the binary value supplied to the shift circuit 26a divided by 2.

Finally, each of the stages is connected together by supplying the output of each stage of the absolute value circuit 24a as the input to the adder of 22b of an immediate adjacent stage as the first binary signal thereof, and by supplying the shifted signal binary signal 36b as the second binary signal to the adder 22b of an immediate adjacent stage, and by supplying the quotient signal 30a to the immediate adjacent stage. The stages perform the operation recursively on the signals provided. In the event it is desired to produce a quotient signal having W significant bits, the circuit 20 would have W identical stages. Alternatively, fewer number of stages can be used where the output of one stage is supplied in a feedback manner into the input of another stage, as shown by the dotted lines 90(a-c) in FIG. 2.

Figure 3A:
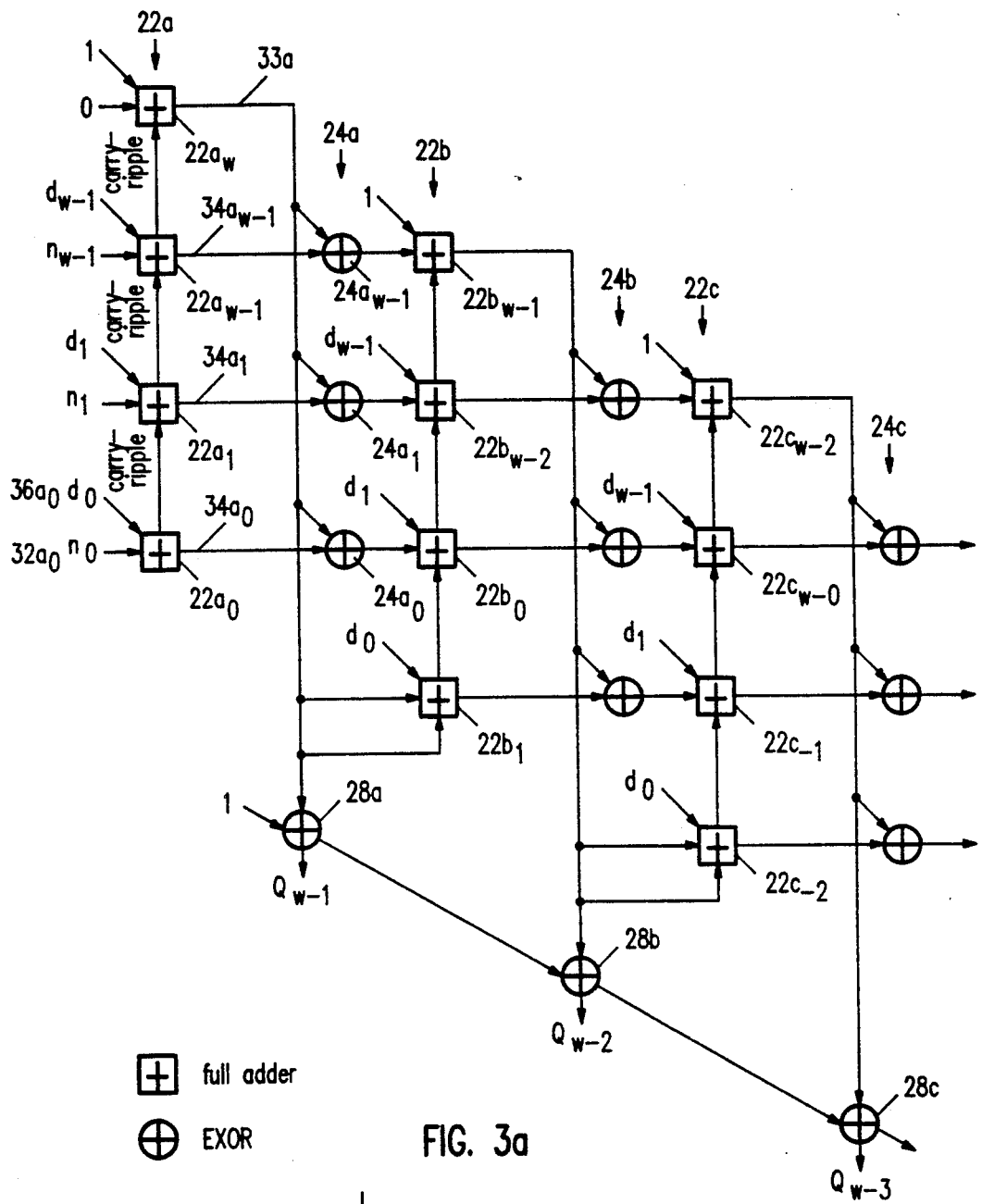
FIG. 3a is a detailed block level diagram of one embodiment of the circuit shown in FIG. 2, wherein each adder comprises a plurality of carry ripple bit adders and wherein the adders operate on a 2's complement representation of a binary number.

Referring to FIG. 3a, there is shown a detailed schematic block diagram of the circuit 20 shown in FIG. 2. In FIG. 3a, the adder 22a is shown as being implemented by a plurality of carry-ripple full bit adders $22a_0-a_{w-1}$, to receive the first and the second binary signals $32a$ and $36a$, with W bits being the maximum number of bits of either the first or the second binary signals $32a$ or $36a$. Each of the carry-ripple full bit adders $22a$ receives a bit signal from the first binary signal $32a$ and the second binary signal $36a$ at the same corresponding bit position. Thus, for example, the full bit adder $22a_0$ receives a bit signal from the first binary signal $32a$ and a bit signal from the second binary signal $36a$ corresponding to the LSB binary position. As previously stated, the first binary signal $32a$ represents a first binary number N in "normal" form, or $n_{w-1} \ldots n_1, n_0$. Thus, the signal presented to the adder $22$ can be $0, n_{w-1}, \ldots n_1, n_0$ with a zero in the $N_w$ position. (This would make N a positive 2's complement number.) The second binary signal $36a$ is the two's complement representation of $-D$. Thus, if D is $D_{w-1}, \ldots D_{w-1}, D_0$ then the two's complement of $-D$ is $1, d_{w-1}, \ldots d_1, d_0$ This representation creates an extra hypothetical bit in the $d_w$ position. Therefore, an extra hypothetical bit adder $22a_w$ is inserted with $d_w = 1$ and $n_w = 0$ supplied as inputs thereto.

The result of the addition (or subtraction of the numbers represented by the signals) by the adder $22a_0$ is the first intermediate binary signal $34a_0$ and a carry signal. The carry signal is supplied to the bit adder $22a_1$ which operates upon the immediate adjacent binary position or the next LSB. In this manner, the plurality of bit adders $22a_I$ add the first binary signal $32a$ to the second binary signal $36a$ from LSB to MSB, through the adder $22a_w$, whose output is the sign bit signal $33a$.

The sign bit signal $33a$ is supplied to the first exclusive OR gate $28a$ to produce a first quotient bit $Q_{w-1}$.

The absolute value circuit $24a$ also comprises a plurality of exclusive OR gates $24a_0 \ldots 24a_{w-1}$. Each of the exclusive OR gates $24a_I$ receives an intermediate binary signal $34a_I$ which is the output from a corresponding carry ripple full bit adder $22a_I$, the sign bit signal $33a$, and generates the second intermediate binary signal $32b_I$ therefrom. Because each of the absolute value bits circuits $24a$ is an exclusive OR gate, the sign bit $33a$ supplied thereto controls the conversion of the supplied first intermediate bit signal $34a$ to produce the appropriate second intermediate binary signal $32b$.

In the event the sign bit $33a$ is 0, this indicates the result of the addition from the adder $22a$ is positive. In that event, a zero supplied to each of the exclusive OR gates $24a_I$, would cause the output to be the first intermediate binary signal $34a_I$. On the other hand, if the sign bit signal $33a$ is high or is "1" indicating the results of the adder $22a$ is negative, then each of the exclusive OR gates $24a_I$ would receive the first intermediate binary signal $34a_I$ and would produce the inverse of the first intermediate binary signal $34a_I$.

As previously stated, if the second binary signal $36a$ is a complement, such as two's complement, representation of a minus binary value (such as $-D$) then the output of the first absolute value circuit $24a$ would be the second intermediate binary signal $22b$ which is "complemented". If the result of the adder $22a$ is positive, then the sign bit $33a$ is "0" and two 0's are added to $d_0$ by the adder $22b_{-1}$, yielding $d_0$ with no carry bit signal. The operation of the adders $22b$ of the next stage is as follows:

$(n_{w-1} - d_{w-1}), \ldots (n_0 - d_0), S + S - 1, d_{w-1}, \ldots d_1, d_0$

Since S, the sign bit signal $33a$ is 0, there is no carry from $d_0$ to $d_1$. The alignment of $(n_0 - d_0)$ to $d_1$ and the shifting of all the bits by one represents the division of D by 2 to produce D/2. Thus the shifter $26$ is simply the alignment of the bits between every bit position I of $(n-d)_I$ from the adder $22$ and the bit position $(I+1)$ of the binary number $d_{I+1}$.

If the sign bit $33a$ is "1" then the result of the adder $22a$ is negative, and the absolute value thereof must be added by "+1" in the LSB. The operation of the adders $22b$ of the next stage should be:

$(N_{w-1} - d_{w-1}), \ldots (N_0 - d_0 + 1) + 1, d_{w-1}, \ldots d_1, d_0$

This is the same as $(n_{w-1} - d_{w-1}), \ldots (n_0 - d_0), 1 + 1 + 1, d_{w-1}, \ldots d_1, d_0$ or $(n_{w-1} - d_{w-1}), \ldots (n_0 - d_0), S + S + 1, d_{w-1}, \ldots d_1, d_0$ where $S = 1$.

The circuit $20$ of FIG. $3a$ shows the addition of N to D, where D is expressed in two's complement notation. As previously discussed, D can also be expressed in one's complement. Referring to FIG. $3b$ there is shown an embodiment of the circuit $20$ wherein the adders $22$ operate on a 1's complement representation of D. In 1's complement representation a 1 must be added to the LSB after the absolute value stage $24$ to "complement" the value, if the sum bit output of the adder $22a_w$ is positive. Thus, similar to the previous discussion, the operation of the adders $22b$ of the next stage should be $(n_{w-1} - d_{w-1}), \ldots (n_0 - d_0 + 1), 1, d_{w-1}, \ldots d_1, d_0$ which is the same as $(n_{w-1} - d_{w-1}), \ldots (n_0 d_0), S + S \ 1, d_{w-1}, \ldots d_1, d_0$ where $S = 1$.

Although the circuits $20$ shown in FIG. $3a$ or $3b$ show that either of the divide circuit $20$ can be pipelined at a bit level, the use of a plurality of carry-ripple full bit adders $22a$ requires a signal flow from LSB to MSB. However, since each absolute value bit circuit $24a_I$ is an exclusive OR gate, whose function is controlled by the sign bit $33a$, operation on the first intermediate binary signal $34a$ would proceed from the MSB to the LSB. This would result in the circuit $20$ that runs from the LSB through all bit levels to the MSB and then back down to the LSB for each stage. Since this occurs repeatedly, this would result in a large latency time and to inefficient skewing buffers.

The latency for a circuit $20$ with a plurality of carry ripple full bit adders, operating on binary signals having W bits is W consecutive additions of W bits width, plus W EXOR gates. This would result in a latency of $W^2$ with an array $(W \times W)$ of carry ripple full bit adders and W EXOR gates. Even with faster adders, such as carry-look-ahead, the latency cannot be reduced below $O(W \log W)$, requiring additional logic gates for the carry generation.

Referring to FIG. $4a$ there is shown the preferred embodiment of the circuit $20$. In the embodiment shown in FIG. $4a$, each of the adders $22a$ comprises a plurality of carry-save bit adders $22a_{w-1-0}$, with each carry-save bit adder $22a_I$ operating upon a bit signal from the first and second binary signals $32a$ and $36a$ respectively. In response thereto, each of the carry-save adders $22a_I$ generates a first intermediate binary signal $34a_I$ and a carry signal. The first intermediate binary signal $34a_I$ is supplied to a corresponding absolute value bit circuit $24a_I$. The carry signal is supplied to the absolute value bit circuit $24a_{I+1}$ operating on the binary position to which the carry signal would have been supplied for binary addition. Since the carry signal flow goes only one single bit level upwards per addition, the latency as a result of using a plurality of carry-save bit adders $22a_I$ is reduced to that of waiting for the adjacent carry-save bit adder $22a_I$ to perform its operation on the adjacent bit. In this manner, pipeline of the adders 22a can proceed from the MSB to the LSB, just like the absolute value circuit 24a.

Figure 5A:
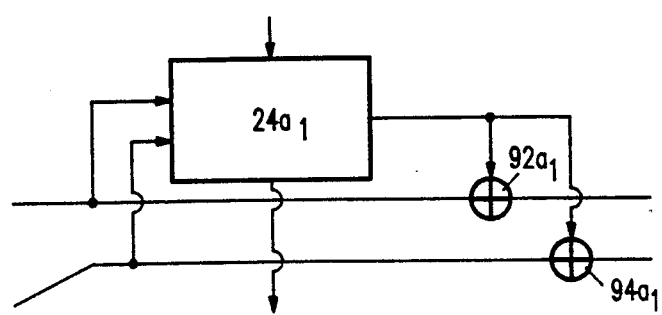
FIG. 5a a block level diagram of the absolute value bit circuit shown in FIG. 4.

Referring to FIG. 5a there is shown a detailed schematic block level diagram of the absolute value bit circuit 24a, in the preferred embodiment. As previously discussed, each of the absolute value bit circuit $24a_I$ receives a first intermediate binary signal $34a_I$ from a carry-save bit adder $22a_I$ corresponding to the same bit position as the absolute value bit circuit $24a_I$, and a carry signal from a carry-save bit adder $22a_{I-1}$ immediately adjacent in bit position to the corresponding bit adder. The two input signals are also supplied to two exclusive OR gates 92 and 94 which are controlled by the result of the absolute value bit circuit 24a and produce the result of the second intermediate binary signal 32b as the output of the absolute value circuit 24a. In addition, the absolute value circuit 24a receives a control signal (which may comprise more than one signal line) to control the operation of the circuit $24a_I$. One of the control signal is the sign bit 33a.

Figure 5B:
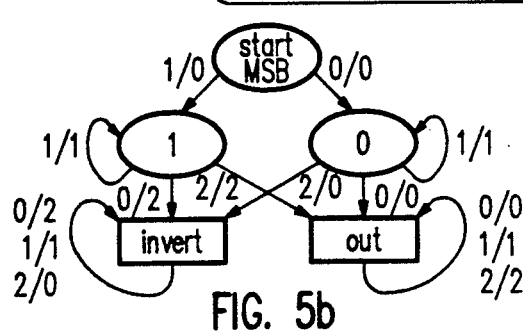

The absolute value bit circuit 24a is a finite state machine whose state diagram is shown in FIG. 5b. The control for each of the absolute value bit circuit 24a begins at the absolute value bit circuit $24a_{w-1}$ which corresponds to the MSB position. Starting at the MSB position, the finite state shown in FIG. 5b steps through iteratively down to the LSB. Each branch is labeled with the value of the current bit-level input, and the output.

The absolute value bit circuit 24a as shown in FIG. 5a and its accompanying finite state shown in FIG. 5b are fully disclosed in G. Fettweis and H. Meyr. High-speed Viterbi processor: A systolic array solution. IEEE Journal on Sel. Areas in Commun., SAC-8(8):1520–1534, October, 1990. In the foregoing article, a carry-save maximization circuit is disclosed. The use of the carry-save maximizing circuit as an absolute value circuit is disclosed in G. Fettweis and H. Meyr. A 100 Mbit/s Viterbi decoder chip: Novel architecture and its realisation. In Proceedings of the 1990 Int. Conf. on Communication, Atlanta, Ga. 1990. Logic for this absolute value bit circuit 24a can be derived from using the finite states defined in and shown in FIG. 5b and by logic synthesizing tools, such as those available from Synopsys Company.

In the aforementioned references, the plurality of carry-save bit adders and carry-save maximizing bit circuits were used for processing a Viterbi algorithm which is used in maximum likelihood sequence estimation.

Figure 3B:
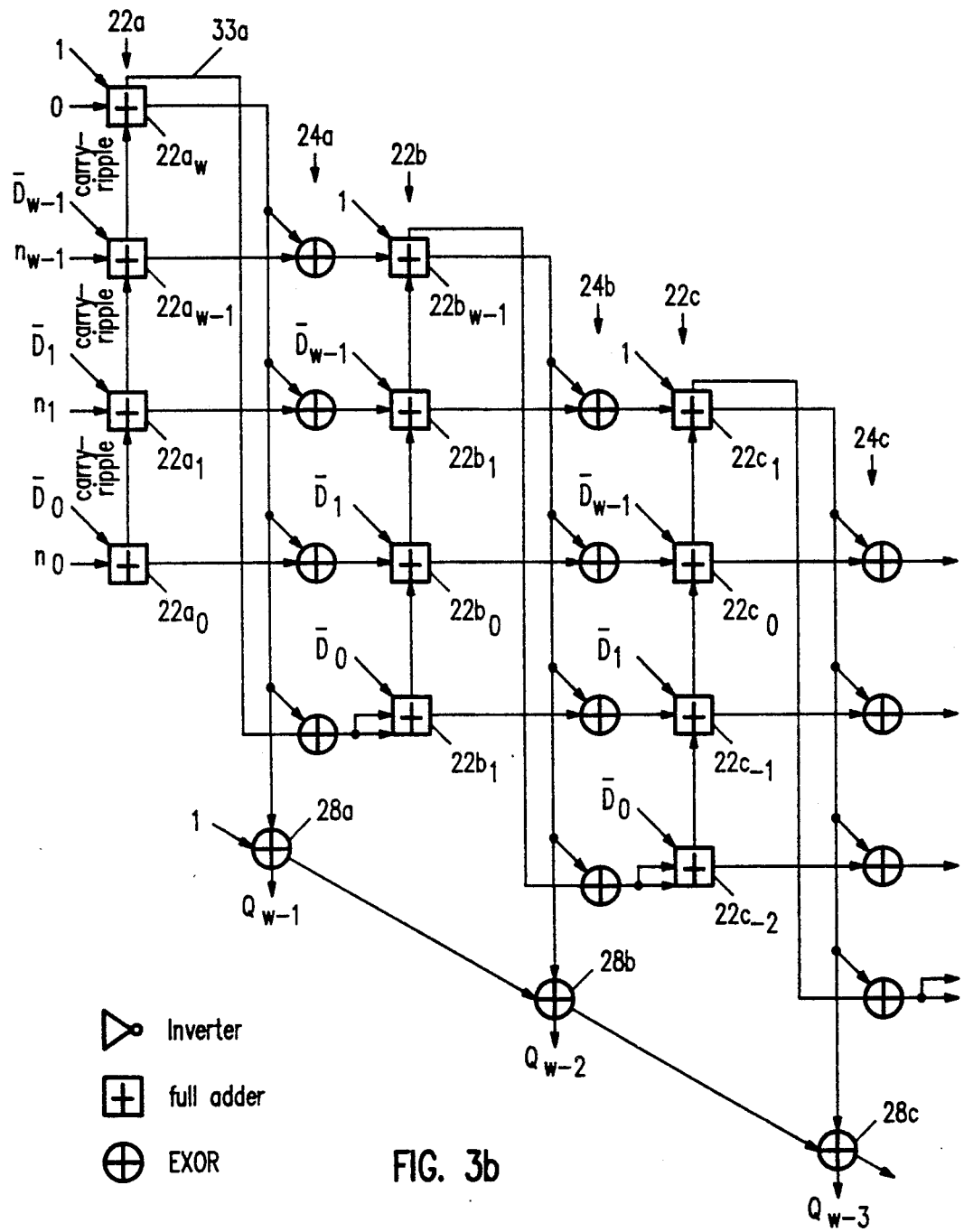
FIG. 3b detailed block level diagram of another embodiment of the circuit shown in FIG. 2, wherein each adder comprises a plurality of carry ripple bit adders and wherein the adders operate on a 1's complement representation of a binary number.

Similar to the discussion for the circuit 20 employing a plurality of carry ripple full bit adders 24, the output of the adder 22a must be uncomplemented. The uncomplementation occurs, if the sign bit signal $33a=1$, by adding the following bit values to the $(n_{w-1}-d_{w-1}), \ldots (n_1-d_1), (n_0-d_0), 12^0, 1\cdot2^{-1}, 2\cdot2^{-2}$ or $(n_{w-1}-d_{w-1}), \ldots (n_1-d_1), (n_0-d_0), 1+\frac{1}{2}+\frac{1}{2}$ or $(n_{w-1}-d_{w-1}), \ldots (n_1-d_1), (n_0-d_0), 2$ or $(n_{w-1}-d_{w-1}), \ldots (n_1-d_1), (n_0-d_0+1)$ Similar to the discussion with regard to the embodiment shown in FIG. 3b, another embodiment of the circuit 20 is where D is expressed in one's complement notation. Operating on a 1's complement representation is shown and described in FIG. 4b.

Figure 4A:
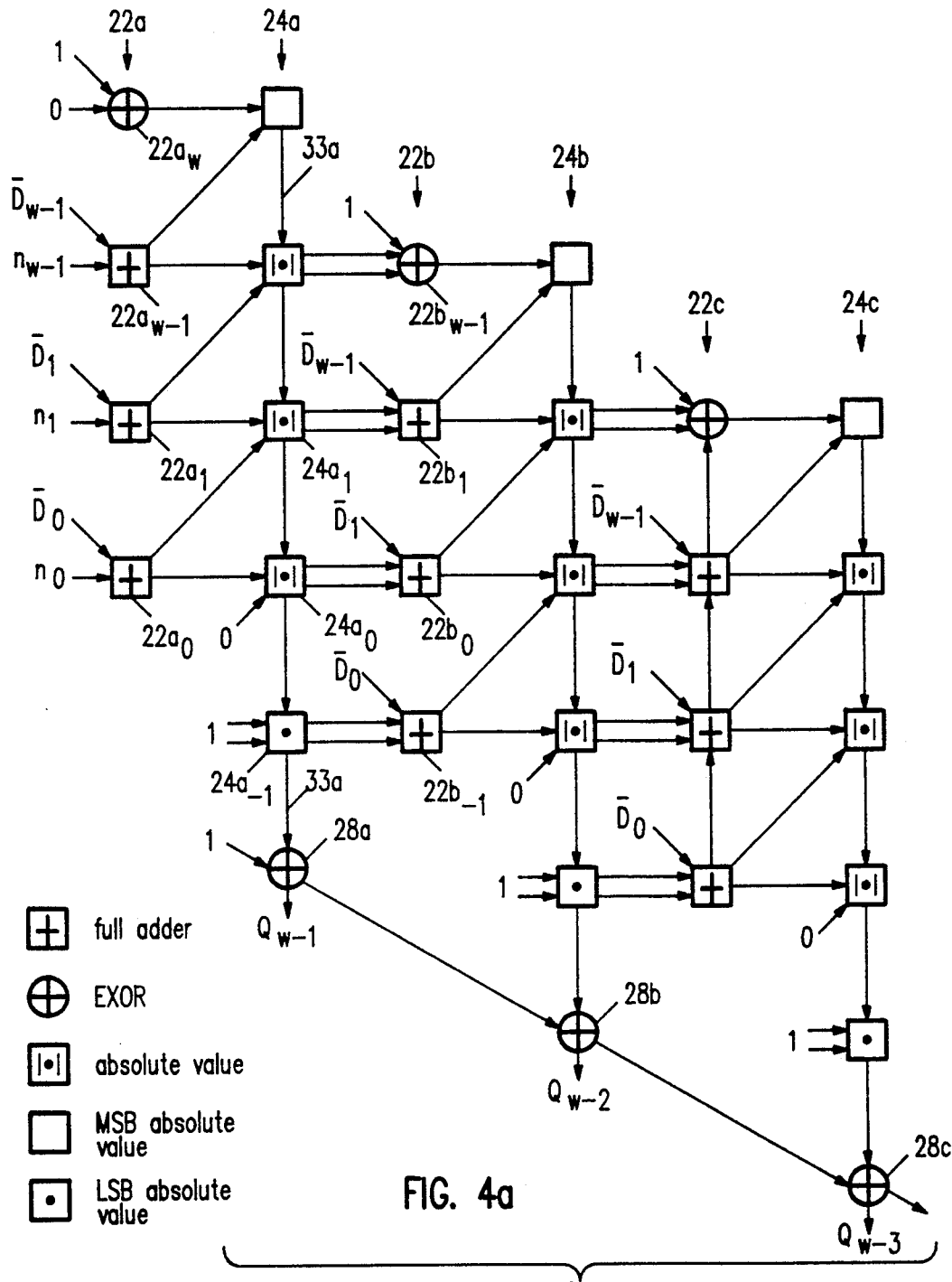
FIG. 4a is a detailed block level diagram of one embodiment of the circuit shown in FIG. 2 wherein each adder comprises a plurality of carry-save bit adders and wherein the adders operate on a 2's complement representation of a binary number.
Figure 4B:
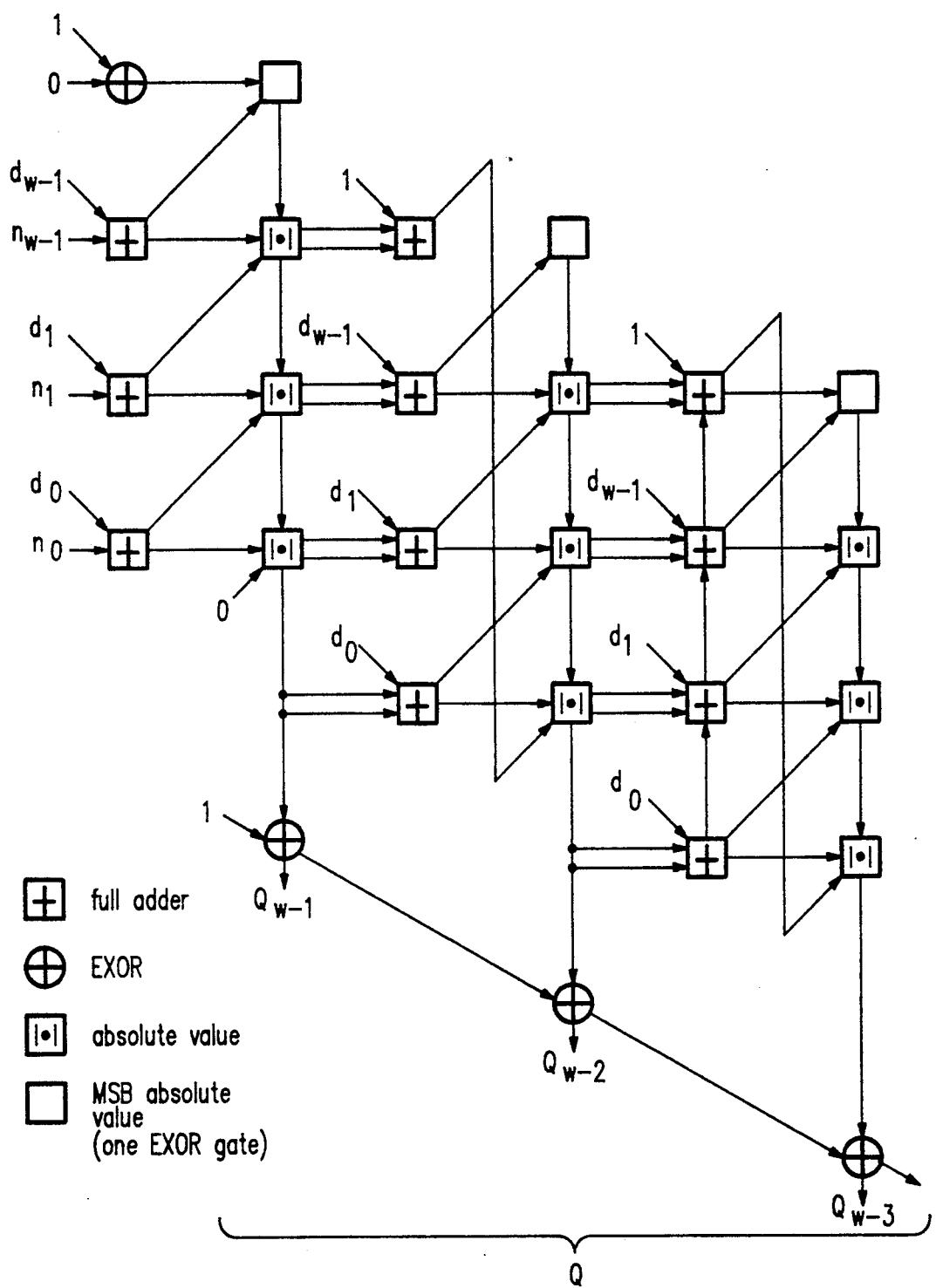
FIG. 4b is a detailed block level diagram of another embodiment of the circuit shown in FIG. 2, wherein each adder comprises a plurality of carry save bit adders and wherein the adders operate on a 1's complement representation of a binary number.
Figure 4C:
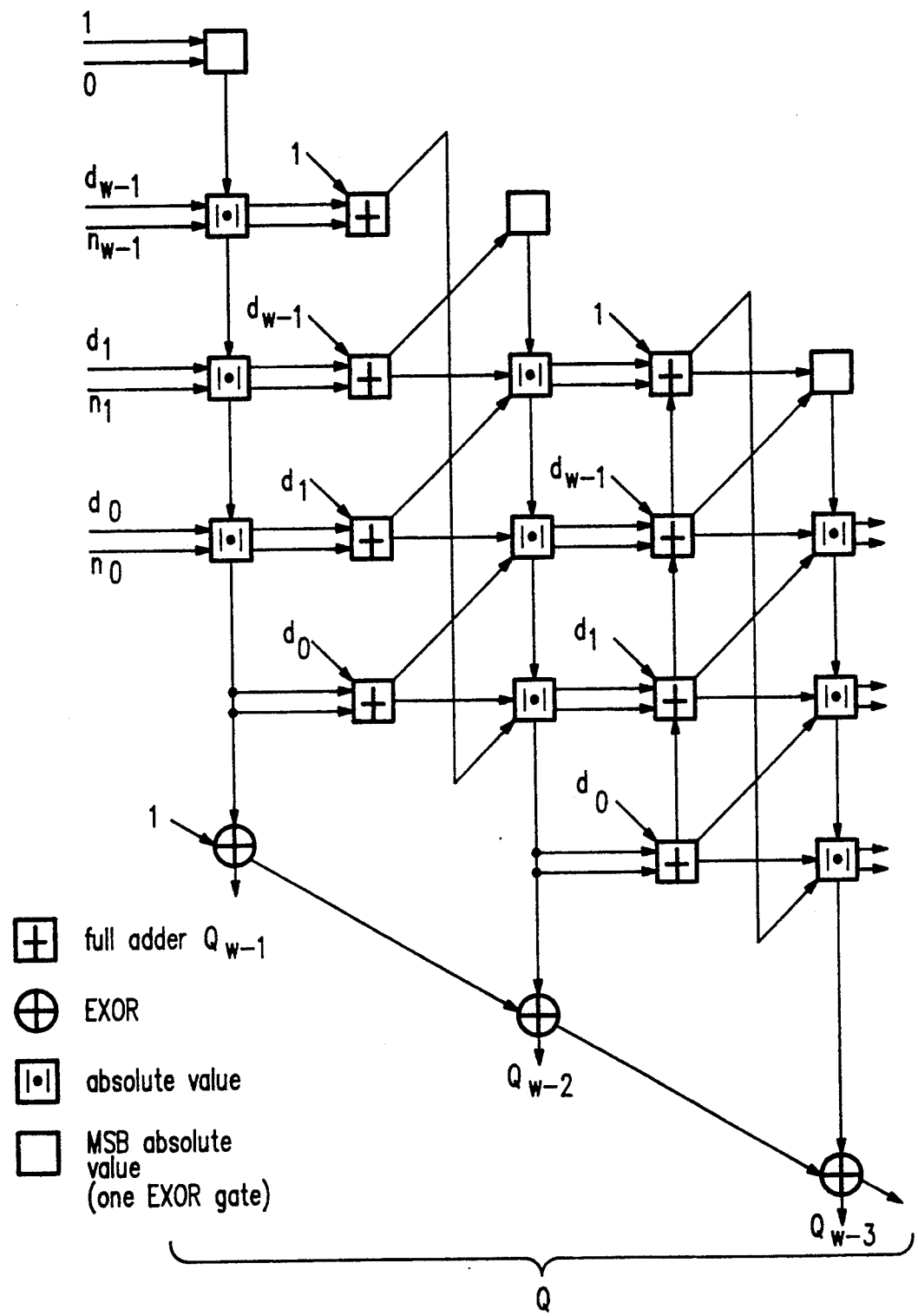
FIG. 4c is a detailed block level diagram of yet another embodiment of the circuit shown in FIG. 2, wherein each adder comprises a plurality of carry save bit adders and wherein the adders operate on a 1's complement representation of a binary number.

FIG. 4c shows another embodiment of the circuit 20 with a plurality of carry-save bit adders 22 operating on a 1's complement representation, with the first stage adders 22 simplified.

Each of the carry save bit adders $22b_I$ is shown in FIG. 4 as receiving two bit signals from the output of the corresponding absolute value bit circuit $24a_I$, and one bit signal from the binary signal $36b_x$ (where X depends on the stage or number of shifts of D), and generating an output bit signal and a carry bit signal in response thereto. Thus, there are three inputs with two outputs. Carry-save bit adders are well known in the art. However, prior art carry-save bit adders receive two sets of two binary input signals each, and generate one output and one carry bit signals therefrom. Thus, the prior art carry-save bit adder receives four inputs and generates two outputs. Thus, the carry save bit adders 22 used in the circuit 20 is a simplified version of the prior art device, and can simply be the prior art device with one input disabled. This, of course, is not an optimized carry-save adder 22.

Figure 6:
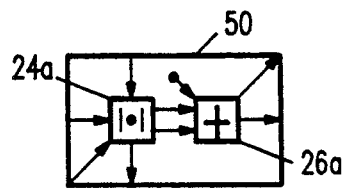
FIG. 6 is a block level diagram showing a combination of an absolute value bit circuit and a corresponding carry-save bit adder circuit, together as one basic cell.

Referring to FIG. 6 there is shown a basic cell 50 comprising of an absolute value bit circuit 24a and its associated carry-save bit adder 26a showing the inputs thereto and the outputs therefrom. With these basic cells 50, a divide circuit 20 comprising of a plurality of these basic cells 50 which can be pipelined at a bit level can be constructed.

Figure 7:
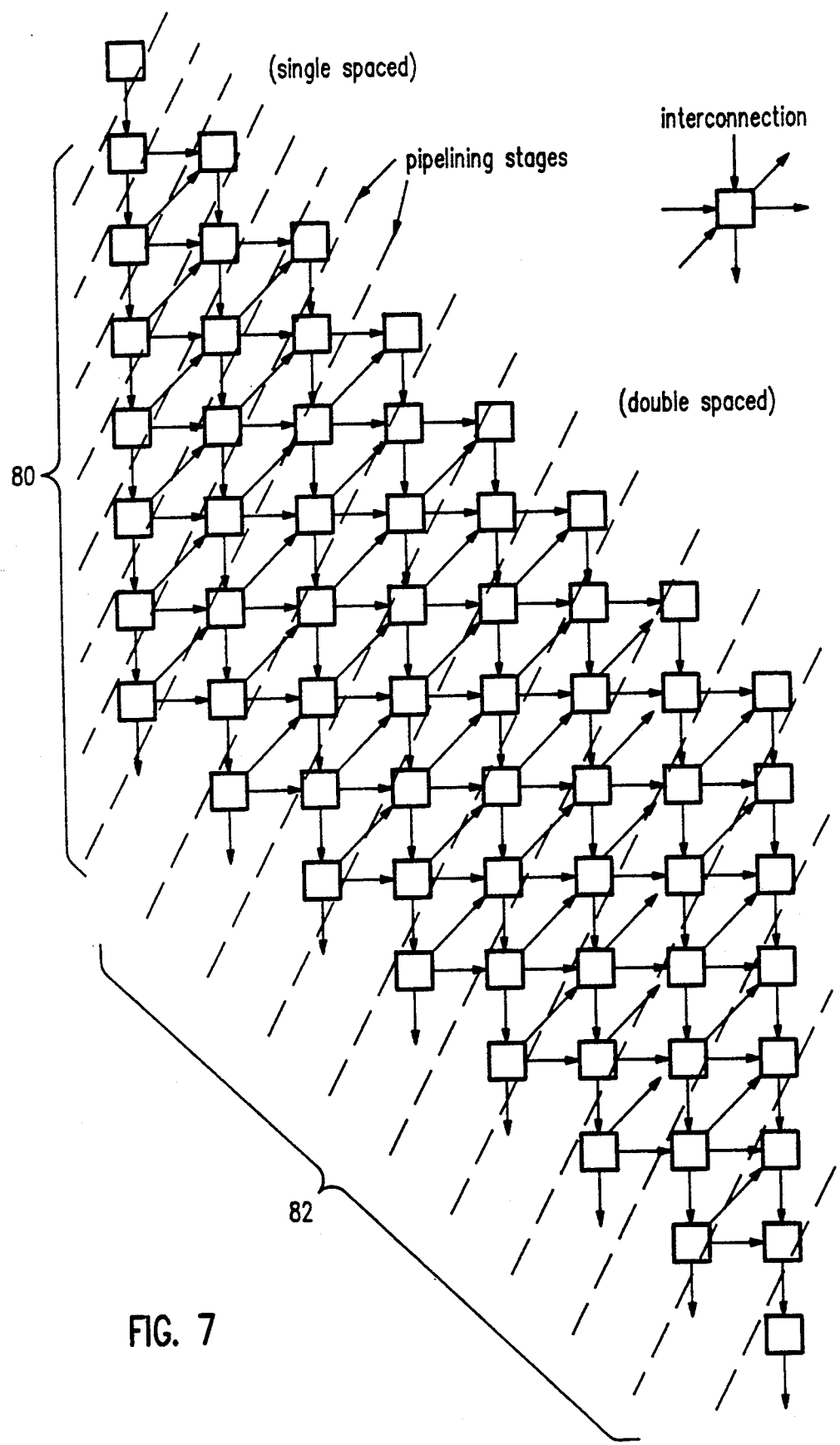
FIG. 7 is an 8-bit level pipeline divide circuit employing a plurality of the cells shown in FIG. 6, showing the location of the registers to accomplish pipeline.

Referring to FIG. 7 there is shown an 8-bit by 8-level divide circuit 20 employing a plurality of the basic cells 50. In the circuit shown in FIG. 7, a plurality of pipeline stages are shown by the plurality of dotted lines 80 and the plurality of dotted lines 82. The intersection of each of the dotted lines 80 and 82 with signal flow lines from each of the cells 50 shows the location where buffers need to be placed in order to pipeline the operation. For the dotted lines 80, buffers are placed at every signal input and output to and from each of the cells 50. Since the cell 50 is small and can operate very quickly (on the order of 1.7 ns), it is not necessary to buffer or place a register at the signal input and output of every signal path to every cell 50. Thus, the plurality of lines 82 do not intersect each of the signal lines input to and output from every single cell 50. The placement of the buffers are more staggered than the placement of buffers in accordance with the location specified by the dotted lines 80. Buffers or registers are placed between corresponding bits in every adjacent stage. However, buffers are staggered between every other bit within a stage.

With the circuit 20 comprising a plurality of basic cells 50, the latency becomes 4 W. Even when taking the increased complexity into account, due to the carry-save bit absolute value generation, the benefits of an array of carry-save bit adders is clear.

Figure 8A:
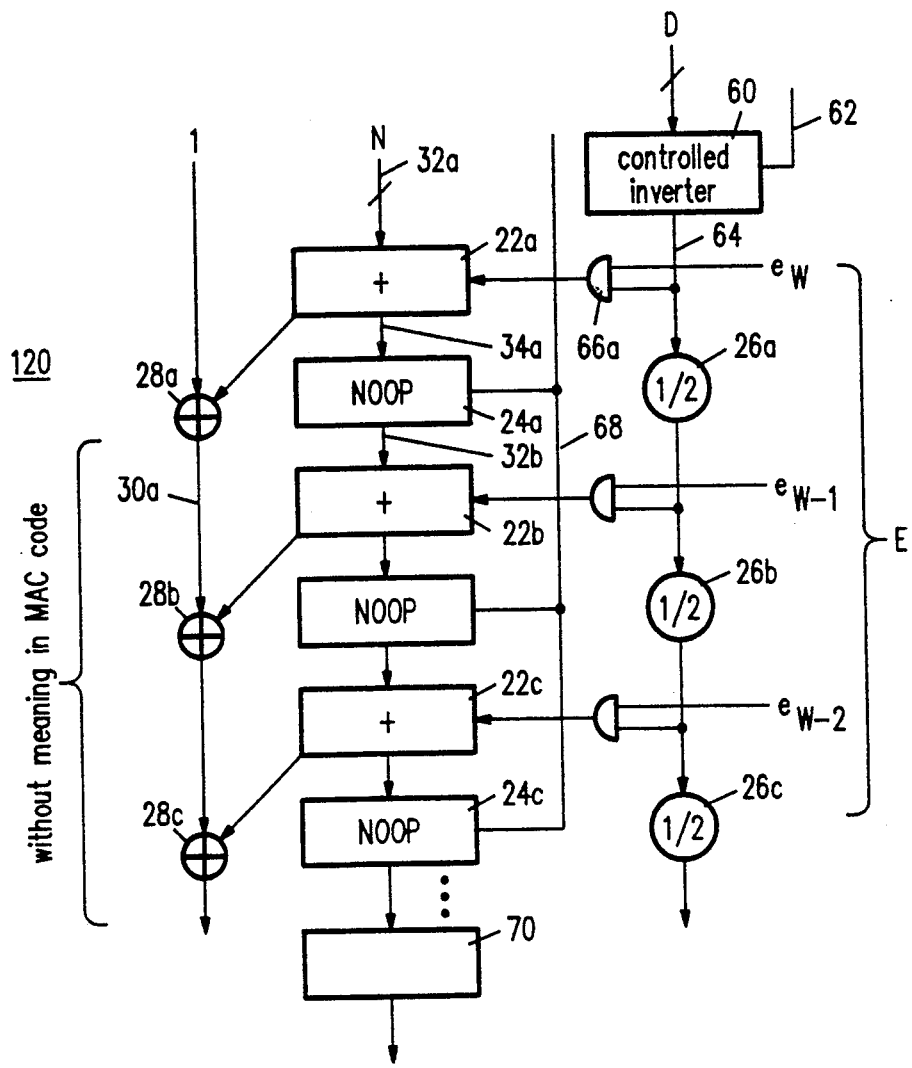
FIG. 8a is a schematic block level diagram of the circuit of the present invention, including the divide circuit portion shown in FIG. 2.

Referring to FIG. 8 there is shown a MAC and divide circuit 120 of the present invention. A portion of the circuit 120 is shown and described in FIGS. 2, 3, 4, and 7. The circuit 120 comprises a controlled inverter 60. The controlled inverter receives the binary signal (D) and a first activation signal 62. The controlled inverter 60 outputs a first intermediate binary signal which can be the first binary signal D or the inverse of the first binary signal $\overline{D}$ in response to the first activation signal 62 being in one state or in another state respectively.

Figure 8B:
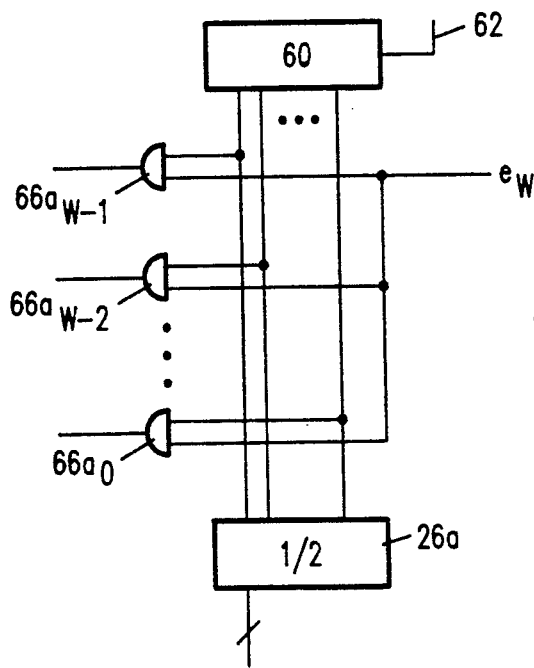

The other portion of the circuit 120 is substantially similar to the circuit 20 shown in FIGS. 2, 3, 4, and 7. The circuit 120 comprises a plurality of stages. Each stage has an adder 22a, an absolute circuit 24a, an exclusive OR gate 28a, and a shifting circuit 26a. The only additional circuit element shown in FIG. 8 is a plurality of AND gates $66a_{w-1-0}$ in each stage. The AND gates 66a receive the first intermediate binary signal 64 and a bit signal corresponding to one binary position of a second binary signal (E) and generates the logical AND thereof for each bit of the first intermediate binary signal 64. This is shown in greater detail in FIG. 8b. The output of the AND gate 66a is a second intermediate binary signal which is supplied to the adder 22a.

The adder 22a adds the binary signal N to the second intermediate binary signal and outputs that as a third intermediate binary signal 34a. The third intermediate binary signal 34a is supplied to the absolute value circuit 124a.

The absolute value circuit 124a is substantially identical to the absolute value circuit 24a shown in FIG. 2. The only difference is that the absolute value circuit 124a of FIG. 8 is responsive to a second activation signal 68 supplied thereto. In response to the second activation signal being in one state or another state, the absolute value circuit 124a either generates the absolute value signal, as is done in FIG. 2, or simply passes the third intermediate binary signal 34a therethrough. Thus, the notation of "NOOP" is shown in FIG. 8 indicating no operation. The circuit 124a of FIG. 8 can simply be the circuit 24a of FIG. 2 being activatable at the MSB level and passed through each of the bits to the control line thereof to indicate no operation.

Figure 9:
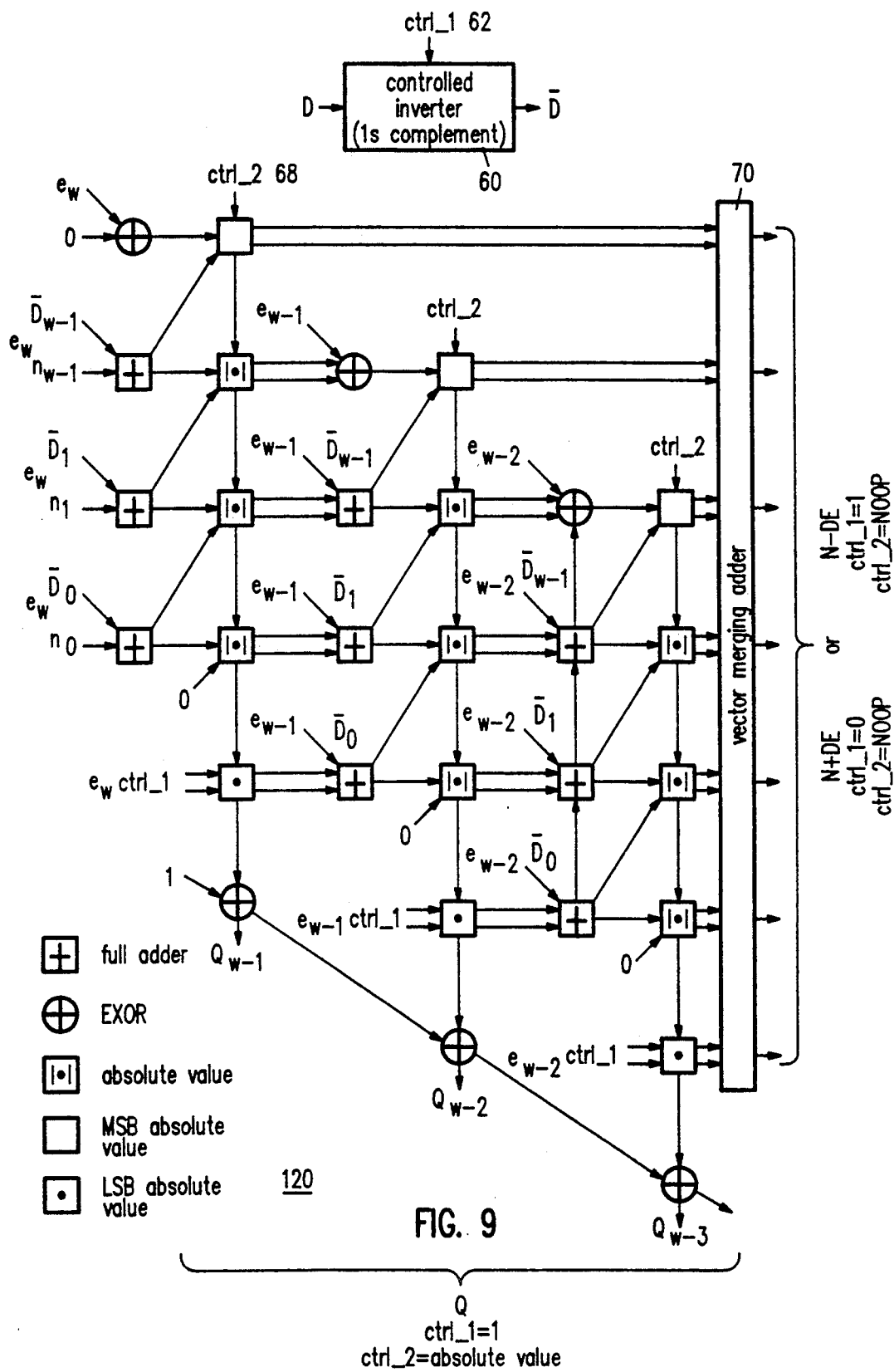
FIG. 9 is a detailed schematic block level diagram of the circuit shown in FIG. 8, using a plurality of carry-save bit adders and absolute value bit circuit means.

Similar to the divide circuit 20 shown in FIG. 4 in greater detail, the circuit 120 can comprise a plurality of carry-save bit adders. FIG. 9 shows a detailed block level diagram of the circuit 120 wherein the adders 22 comprise a plurality of carry-save bit adders. In addition, the fourth intermediate binary signal 32 which is the output of the last stage of the absolute value circuit 24, is supplied to a vector merge adder 70. The function of the vector merge adder 70 is to convert the binary signal in carry-save notation to a conventional binary notation.

In the embodiment shown in FIG. 9, the first activation signal 62 controls the controlled inverter 60, such that either the first binary signal (D) is passed through or the inverse first binary signal ($\overline{D}$) in 1's complement is passed through. For 1's complement each bit of the first binary signal D is inverted. Thus, the controlled inverter 60 can simply be a plurality of exclusive OR gates.

In contrast, if the inverse first binary signal ($\overline{D}$) in 2's complement is passed through, each bit of D must be inverted and a 1 must be added in the LSB. Thus, operating upon D in 1's complement reduces circuit complexity.

To restore or uncomplement the output of each adder stage, the term $e_w$, $e_{w-1}$, $e_{w-2}$ is added in the $2^0$, $2^{-1}$, $2^{-2}$ positions as described heretofore.

The circuit 120 has two possible modes of operation. In the first mode, the second binary signal (E) are all set to "1" or is high. In addition, the first activation signal 62 is in a first state such that the inverse first binary signal $\overline{D}$ is supplied as the output thereof on the first intermediate binary signal 64. This would correspond to the 2's complement representation of $-D$. In addition, the second activation signal 68 is in the first state such that the absolute value circuit 24 operates to generate the absolute value signal of the third intermediate signal 34 supplied thereto, as the output thereof. In this mode of operation, the circuit 120 functions exactly like the divide circuit 20 as explained heretofore.

In a second mode of operation, the second activation signal 68 is set in a second state. The absolute value circuit 24 would no longer operate and a "NOOP" would result with the third intermediate signal 34a being passed therethrough. In this mode of operation, the output of the vector and merge circuit 70 is either:

$N + e_w \cdot D + e_{w-1} \cdot D/2 + e_{w-2} \cdot D/4 \ldots$ which is:

$N + D(e_w \cdot 2^0 + e_{w-1} \cdot 2^{-1} + \ldots e_0 \cdot 2^{w-1}) = N + D \cdot E \cdot 2^{-(w-1)}$ if the first activation signal is in the second state, or is the result $N - D \cdot E \cdot 2^{-(w-1)}$ if the first activation signal is in the first state. With a shifter before the signal E is supplied, the result can be $N + D \cdot E$ or $N - D \cdot E$ The first and second activation signals can both be the same. However, this would limit the circuit 120 to operate either as $Q = N/D$ or $N + D \cdot E$.

Similar to the embodiment shown in FIG. 7, each of the absolute value bit circuit 24 and its corresponding carry-save bit adder 22 can be a basic cell 50, as shown and described in FIG. 6.

Thus, as can be seen from the foregoing, a circuit 120 capable of performing MAC and divide and having bit level pipeline capability is achieved. In addition, because it uses a plurality of basic cells 50, implementation thereof can be easily achieved with VLSI technology.

What is claimed is:

1. A digital divide and multiply circuit, said circuit comprising:

first activatable circuit means for receiving a first binary signal (D) having a plurality of first bit signals, and for generating a first intermediate binary signal in response to a first activation signal, said first intermediate binary signal being said first binary signal (D) in response to said first activation signal being in one state and said first intermediate binary signal being the inverse of said first binary signal ($\overline{D}$) in response to said first activation signal being in another state;

a plurality of substantially similar stages, each stage comprising:

a) second circuit means for receiving said first intermediate binary signal and a bit signal corresponding to one binary position of a second binary signal (E), and for generating the logical AND thereof to each of said plurality of first bit signals, to produce a second intermediate binary signal;

b) third circuit means for receiving a third binary signal (N) and said second intermediate binary signal and for adding said signals to produce a third intermediate binary signal, said third intermediate binary signal having a plurality of bit signals including a sign bit signal;

c) fourth activatable circuit means for receiving said third intermediate binary signal and for generating a fourth intermediate binary signal in response to a second activation signal, said fourth intermediate binary signal being said third intermediate binary signal in response to said second activation signal being in one state, and said fourth intermediate binary signal being the absolute value of said third intermediate binary signal in response to said second activation signal being in another state;

d) fifth circuit means for receiving said first intermediate binary signal and for shifting said intermediate binary signal by one bit to produce a fifth intermediate binary signal therefrom said fifth intermediate binary signal representative of the value of the number represented by said first intermediate binary signal divided by two:

e) sixth circuit means for receiving said sign bit signal and a resultant bit signal from a prior stage and forming an exclusive OR therefrom to produce a resultant bit signal of the current stage; and means for connecting said plurality of stages by supplying said fourth intermediate binary signal from one stage as the third binary signal to the third circuit means of another stage, and by supplying the fifth intermediate binary signal from one stage as the first intermediate binary signal to the second circuit means of another stage;

wherein in response to said second activation signal being in one state, said circuit generating the fourth intermediate binary signal from the last stage as a binary multiply and accumulate of $D*E+N$ in response to said first activation signal being in one state, and $-D*E+N$ in response to said first activation signal being in another state; and wherein in response to said second binary signal E being high and said first and second activation signals being in another state said circuit generating the resultant bit signal as a binary quotient of $N/D$.

2. The circuit of claim 1 wherein in response to said second binary signal E being high and said first and second activation signals being in another state, said first binary signal is representative of a two's complement denominator value (D).

3. The circuit of claim 2, wherein said adder is a carry ripple adder for adding the signals supplied thereto from the least significant bit to the most significant bit.

4. The circuit of claim 3, wherein said carry ripple adder comprises a plurality of bit adders one operating on each bit of the fourth intermediate binary signal and second intermediate binary signal.

5. The circuit of claim 4, wherein said fourth circuit means produces an absolute value signal from said third intermediate binary signal from the most significant bit to the least significant bit.

6. The circuit of claim 5, wherein said fourth circuit comprises a plurality of exclusive OR gate circuits, one operating on each bit of the third intermediate binary signal.

7. The circuit of claim 2, wherein said adder is a carry-save adder for adding the signals supplied thereto from the most significant bit to the least significant bit.

8. The circuit of claim 7, wherein said adder comprises a plurality of carry-save bit adders, one for each bit of the fourth intermediate binary signal and second intermediate binary signal.

9. The circuit of claim 8, wherein said fourth circuit means is a maximization circuit for producing an absolute value signal from said third intermediate binary signal from the most significant bit to the leas significant bit.

10. The circuit of claim 9, wherein said maximization circuit comprises a plurality of bit maximization circuit, one operating on each of the third intermediate binary signal.

11. The circuit of claim 10, wherein:
each carry-save bit adder receives two bits of the fourth intermediate binary signal from the corresponding bit maximization circuit, and one bit of the second intermediate binary signal from the same corresponding bit position, and generates an output bit signal and a carry bit signal.

12. The circuit of claim 11, wherein:
each bit maximization circuit receives the output bit signal from the corresponding carry-save bit adder, and the carry bit signal from the bit immediately adjacent in bit position to the output bit signal.

13. The circuit of claim 1, wherein said first and second activation signals are the same.

14. The circuit of claim 1 wherein said connecting means is a feedback connecting means.

15. A multiply and divide circuit comprising:
first activatable circuit means for receiving a first binary signal (D) having a plurality of first bit signals, and for generating a first intermediate binary signal in response to a first activation signal, said first intermediate binary signal being said first binary signal (D) in response to said first activation signal being in one state and said first intermediate binary signal being the inverse of said first binary signal ($\overline{D}$) in response to said first activation signal being in another state;

a plurality of substantially similar stages, each stage comprising:

a) second circuit means for receiving said first intermediate binary signal and a bit signal corresponding to one binary position of a second binary signal (E), and for generating the logical AND thereof to each of said plurality of first bit signals, to produce a second intermediate binary signal;

b) a plurality of carry-save bit adder means, each for adding a third binary signal corresponding to a binary position of a third binary number (N) to the second intermediate binary signal corresponding to the same binary position, to generate a third intermediate binary signal and a carry binary signal;

c) a plurality of absolute value bit circuit means, activatable in response to a second activation signal, each absolute value bit circuit means correspond to one carry-save bit adder means for receiving the third intermediate binary signal therefrom and the carry binary signal from a carry-save bit adder means immediately adjacent in binary position to the corresponding carry-save bit adder means; in response to the second activation signal being in one state, each absolute value bit circuit means generates a fourth intermediate binary signal, representing the absolute value; and in response to the second activation signal being in another state, each absolute value bit circuit means generates said third intermediate binary signal supplied thereto;

d) shifting circuit means for receiving the first intermediate binary signal and for shifting said first intermediate binary signal by one bit, corresponding to dividing the binary number supplied thereto by two, to produce a fifth intermediate binary signal;

e) logical exclusive OR gate means for receiving the carry binary signal of the carry-save bit adder means corresponding to the most significant bit of the third binary number and for receiving a quotient bit signal generated from a previous stage and for generating a quotient bit signal of the current stage, which is the exclusive OR thereof; and means for connecting said plurality of stages by supplying said fourth intermediate binary signal from one stage as the third binary signal to the third circuit means of another stage, and by supplying the fifth intermediate binary signal from one stage as the first intermediate binary signal to the second circuit means of another stage;

wherein in response to said second activation signal being in one state, said circuit generating the fourth intermediate binary signal from the last stage as a binary multiply and accumulate of: $D*E+N$ in response to said first activation signal being in one state, and $-D*E+N$ in response to said first activation signal being in another state; and wherein in response to said second binary signal E being high and said first and second activation signals being in another state said circuit generating the resultant bit signal as a binary quotient of N/D.

16. A digital divide and multiply circuit, said circuit comprising:

a) first activatable circuit means for receiving a first binary signal (D) having a plurality of first bit signals, and for generating a first intermediate binary signal in response to a first activation signal, said first intermediate binary signal being said first binary signal (D) in response to said first activation signal being in one state and said first intermediate binary signal being the inverse of said first binary signal ($\overline{D}$) in response to said first activation signal being in another state;

b) second circuit means for receiving said first intermediate binary signal and a bit signal corresponding to one binary position of a second binary signal (E), and for generating the logical AND thereof to each of said plurality of first bit signals, to produce a second intermediate binary signal;

c) third circuit means for receiving a third binary signal (N) and said second intermediate binary signal and for adding said signals to produce a third intermediate binary signal, said third intermediate binary signal having a plurality of bit signals including a sign bit signal;

d) fourth activatable circuit means for receiving said third intermediate binary signal and for generating a fourth intermediate binary signal in response to a second activation signal, said fourth intermediate binary signal being said third intermediate binary signal in response to said second activation signal being in one state, and said fourth intermediate binary signal being the absolute value of said third intermediate binary signal in response to said second activation signal being in another state;

e) fifth circuit means for receiving said first intermediate binary signal and for shifting said intermediate binary signal by one bit to produce a fifth intermediate binary signal therefrom said fifth intermediate binary signal representative of the value of the number represented by said first intermediate binary signal divided by two:

f) sixth circuit means for receiving said sign bit signal and a resultant bit signal from a prior stage and forming an exclusive OR therefrom to produce a resultant bit signal of the current stage; and g) feedback means for connecting said fourth intermediate binary signal to the third circuit means as the third binary signal thereof, and the fifth intermediate binary signal to the second circuit means as the first intermediate binary signal thereof.

wherein in response to said second activation signal being in one state, said circuit generating the fourth intermediate binary signal as a binary multiply and accumulate of $D*E+N$ in response to said first activation signal being in one state, and $-D*E+N$ in response to said first activation signal being in another state; and wherein in response to said second binary signal E being high and said first and second activation signals being in another state said circuit generating the resultant bit signal as a binary quotient of N/D.

* * * * *